(12) United States Patent
Chang

(10) Patent No.: US 11,142,277 B2
(45) Date of Patent: Oct. 12, 2021

(54) MULTIFUNCTIONAL SIDECAR FOR MOTORCYCLE

(71) Applicant: Woojin Chang, Seoul (KR)

(72) Inventor: Woojin Chang, Seoul (KR)

( * ) Notice: Subject to any disclaimer, the term of this patent is extended or adjusted under 35 U.S.C. 154(b) by 307 days.

(21) Appl. No.: 16/355,396

(22) Filed: Mar. 15, 2019

(65) Prior Publication Data

US 2020/0290701 A1 Sep. 17, 2020

(51) Int. Cl.
*B62K 27/02* (2006.01)
*B62K 27/10* (2006.01)

(52) U.S. Cl.
CPC .............. *B62K 27/02* (2013.01); *B62K 27/10* (2013.01)

(58) Field of Classification Search
CPC ................................ B62K 27/02; B62K 27/10
USPC .......................................................... 280/203
See application file for complete search history.

(56) References Cited

U.S. PATENT DOCUMENTS

| | | | | |
|---|---|---|---|---|
| 3,788,670 | A * | 1/1974 | Petersen | B62B 13/18 280/203 |
| 4,221,276 | A * | 9/1980 | Mitchell | B62K 5/025 180/209 |
| 4,580,652 | A * | 4/1986 | Turner | A61G 3/061 180/11 |

FOREIGN PATENT DOCUMENTS

| | | |
|---|---|---|
| KR | 20-1988-0015127 | 11/1990 |
| KR | 10-2008-0134243 | 8/2009 |
| KR | 10-2014-0059470 | 5/2015 |
| KR | 10-2014-0174545 | 3/2016 |

OTHER PUBLICATIONS

English Specification of 10-2014-0059470.
English Specification of 10-2014-0174545.
English Specification of 10-2008-0134243.
English Specification of 20-1988-0015127.

* cited by examiner

*Primary Examiner* — Minnah L Seoh
*Assistant Examiner* — Felicia L. Brittman
(74) *Attorney, Agent, or Firm* — Antonio Ha & U.S. Patent, LLC

(57) ABSTRACT

A multifunctional sidecar for a motorcycle comprises a frame detachably provided at a side of the motorcycle and having a main wheel at a side thereof, a base plate rotatably coupled to a first side of the frame and folded in an upright position or unfolded to overlap a top of the frame, a side plate rotatably coupled to a second side of the frame and folded in an upright position or unfolded to extend from the second side of the frame, a rear plate rotatably coupled to a rear portion of the frame and folded in an upright position or unfolded to extend from the rear portion of the frame, supports supporting the side plate and the rear plate when the side plate and the rear plate are in the unfolded positions, and a coupling device connecting the sidecar with the motorcycle.

7 Claims, 11 Drawing Sheets

MULTIFUNCTIONAL SIDECAR FOR MOTORCYCLE

TECHNICAL FIELD

Embodiments of the present disclosure concern a sidecar, and more specifically, to a multifunctional sidecar for use in conjunction with motorcycles, capable of easier attachment to a motorcycle and folding and unfolding to allow for a spacious storage room or transformation into a bench.

DISCUSSION OF RELATED ART

With solo camping or backpacking gaining popularity, more and more folks enjoy motorcycle camping—so-called motocamping. Such touring type, however, is significantly limited, e.g., by the capacity of carrying luggage. The use of a motorcycle trailer may be an alternative to addressing such issue. A motorcycle trailer is typically attached to the rear of a motorcycle and towed behind as the motorcycle drives. However, it involves lots of safety issues, such as putting the user at risk when running or parked on the icy slipper site or causing severe inconvenience when in use on uneven grounds.

SUMMARY

According to an embodiment of the present disclosure, a sidecar for a motorcycle comprises a frame detachably provided at a side of the motorcycle and having main wheel at a side thereof, a base plate rotatably coupled to a first side of the frame and folded in an upright position or unfolded to overlap a top of the frame, a side plate rotatably coupled to a second side of the frame and folded in an upright position or unfolded to extend from the second side of the frame, a rear plate rotatably coupled to a rear portion of the frame and folded in an upright position or unfolded to extend from the rear portion of the frame, supports supporting the side plate and the rear plate when the side plate and the rear plate are in the unfolded positions, and a coupling device connecting the sidecar with the motorcycle.

The base plate may include a first base board rotatably coupled to the frame by a first base hinge and a second base board rotatably coupled to the first base board by a second base hinge. The side plate may include a first side board rotatably coupled to the frame by a first side hinge, a second side board rotatably coupled to the first side board by a second side hinge, and a third side board rotatably coupled to the second side board by a third side hinge. The rear plate may include a first rear board rotatably coupled to the frame by a first rear hinge, a second rear board rotatably coupled to the first rear board by a second rear hinge, and a third rear board rotatably coupled to the second rear board by a third rear hinge.

The sidecar may further comprise a bottom plate detachably provided to overlap a top of the third side board when the first side board and the second side board are rotated into the upright position, and the third side plate is rotated to overlap the top of the frame.

The bottom plate may include a first bottom board, a second bottom board, and a third bottom board rotatably coupled to each other.

The sidecar may further comprise a storage compartment in a front portion of the frame. The storage compartment may be opened and closed by a bonnet. A side plate may be provided at a side of the base plate. A first fastener may be configured to fasten the side plate in the upright position to the storage compartment, and a second fastener may be configured to fasten the rear plate in the upright position to the side plate.

The second of the frame may include a first insertion hole and a first coupling hole that is inclined and positioned between two opposite steps. A side of the motorcycle may include a second insertion protrusion and a second coupling hole. The coupling device may include a first coupler and a second coupler. A first side of the first coupler may include a first coupling protrusion inclined to correspond to the first coupling hole and second steps provided at both sides of the first coupling protrusion and contacting the first steps. A second side of the first coupler may include a second coupling protrusion fitted into the second coupling hole. A first side of the second coupler may include a first insertion protrusion fitted into the first insertion hole and a second side of the second coupler may include a second insertion hole fitted over the second insertion protrusion.

The first coupling hole and the first coupling protrusion, the second coupling hole and the second coupling protrusion, the first insertion hole and the first insertion protrusion, and the second insertion hole and the second insertion protrusion may be mutually fastened by fastening pins passing therethrough.

The sidecar may further comprise a buoyant seating member having a seat and detachably provided on the top of the frame.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the present disclosure will be described in detail with reference to the accompanying drawings. The present disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
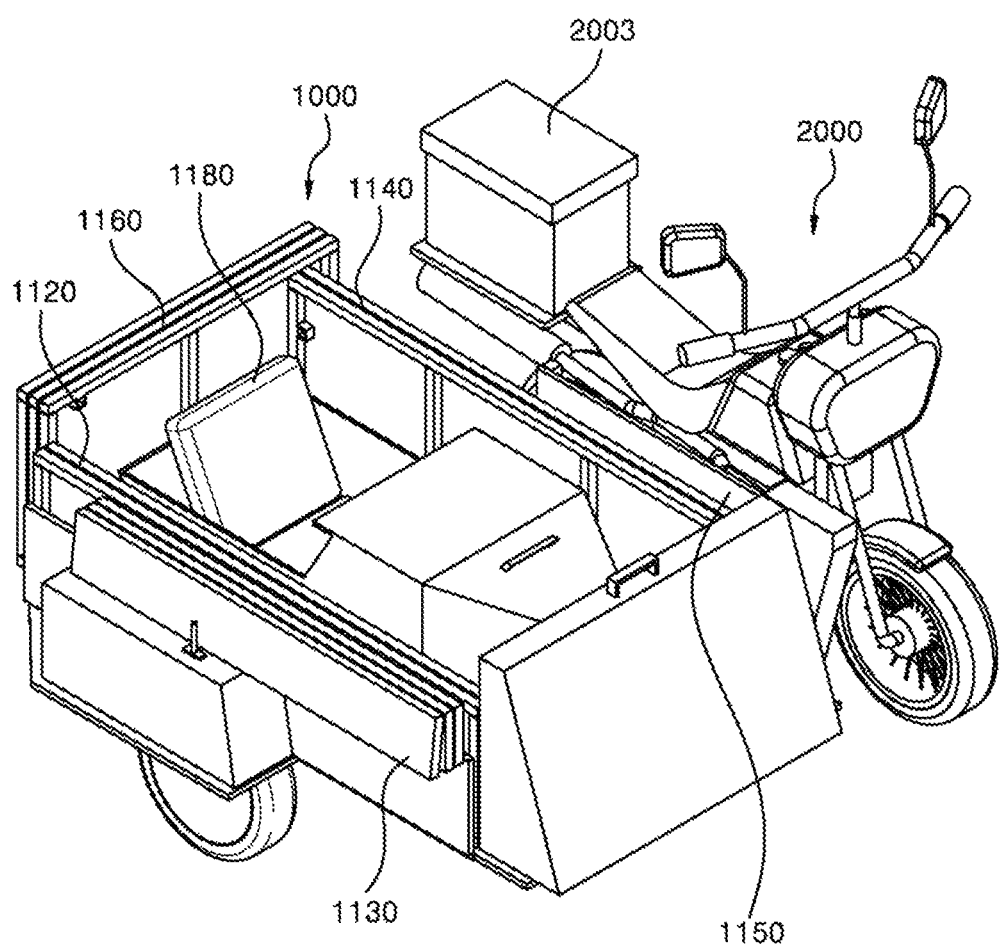
FIG. 1 is a perspective view illustrating a motorcycle sidecar according to an embodiment of the present disclosure.
Figure 2:
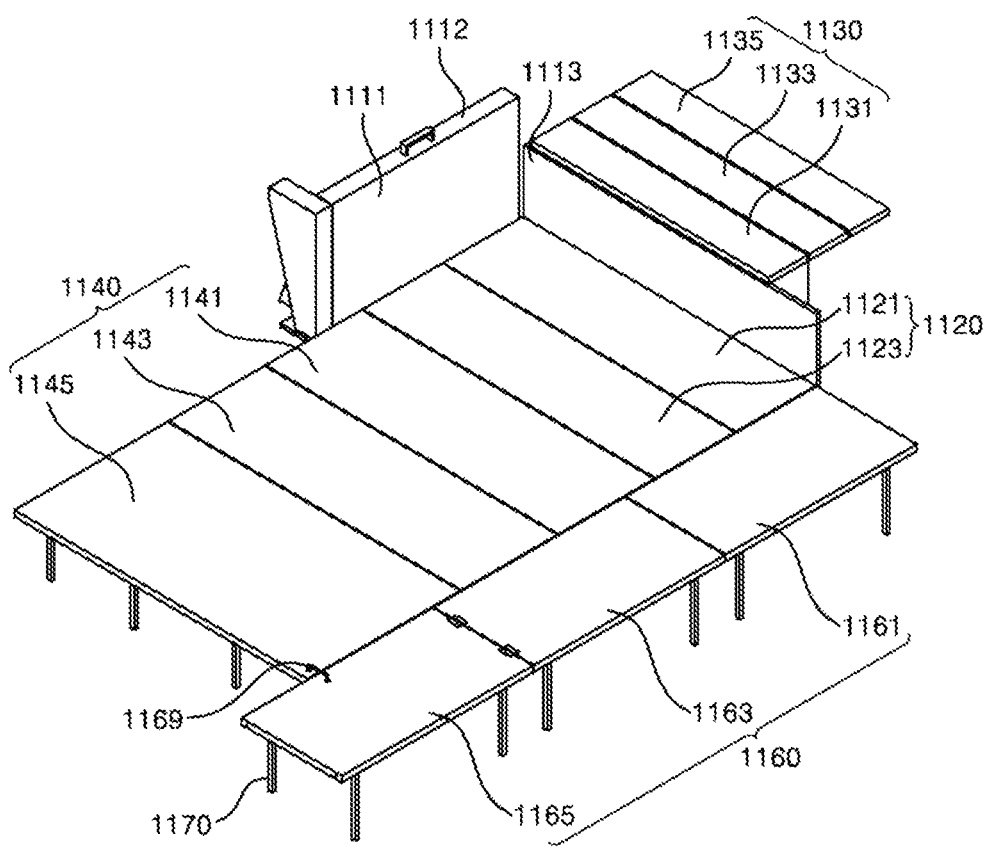
FIG. 2 is a perspective view illustrating a main body of a motorcycle sidecar according to an embodiment of the present disclosure.
Figure 3:
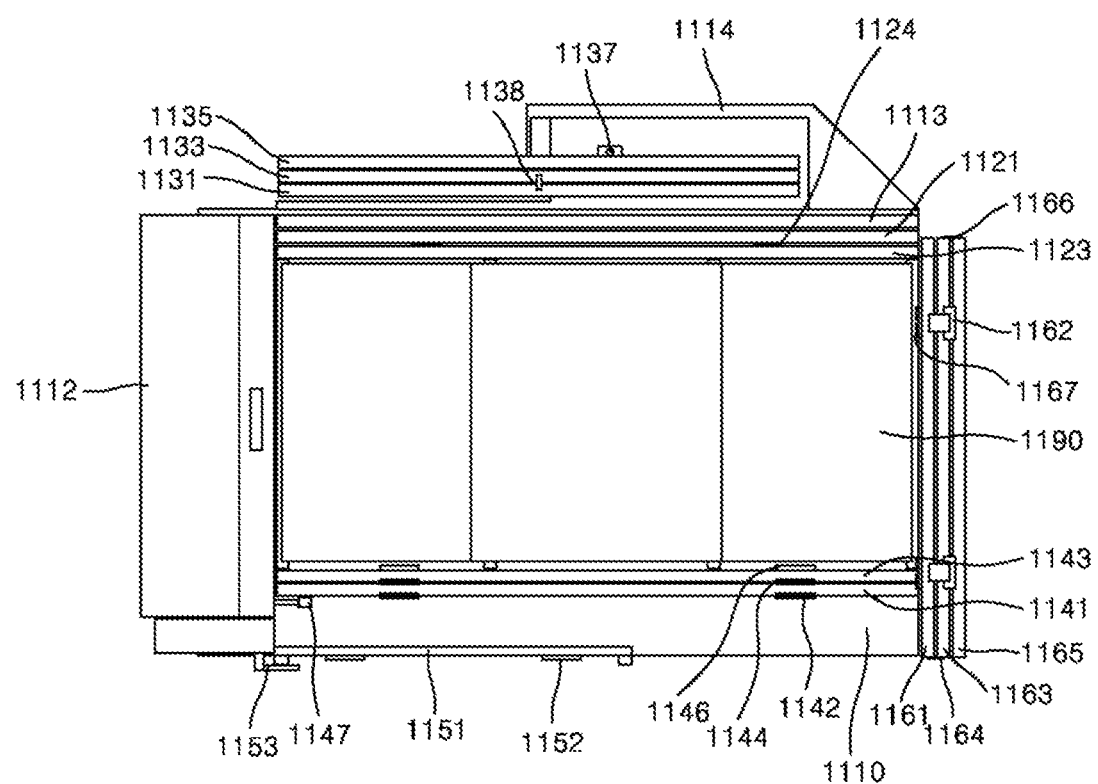
FIG. 3 is a plan view illustrating a main body of a motorcycle sidecar according to an embodiment of the present disclosure.
Figure 4:
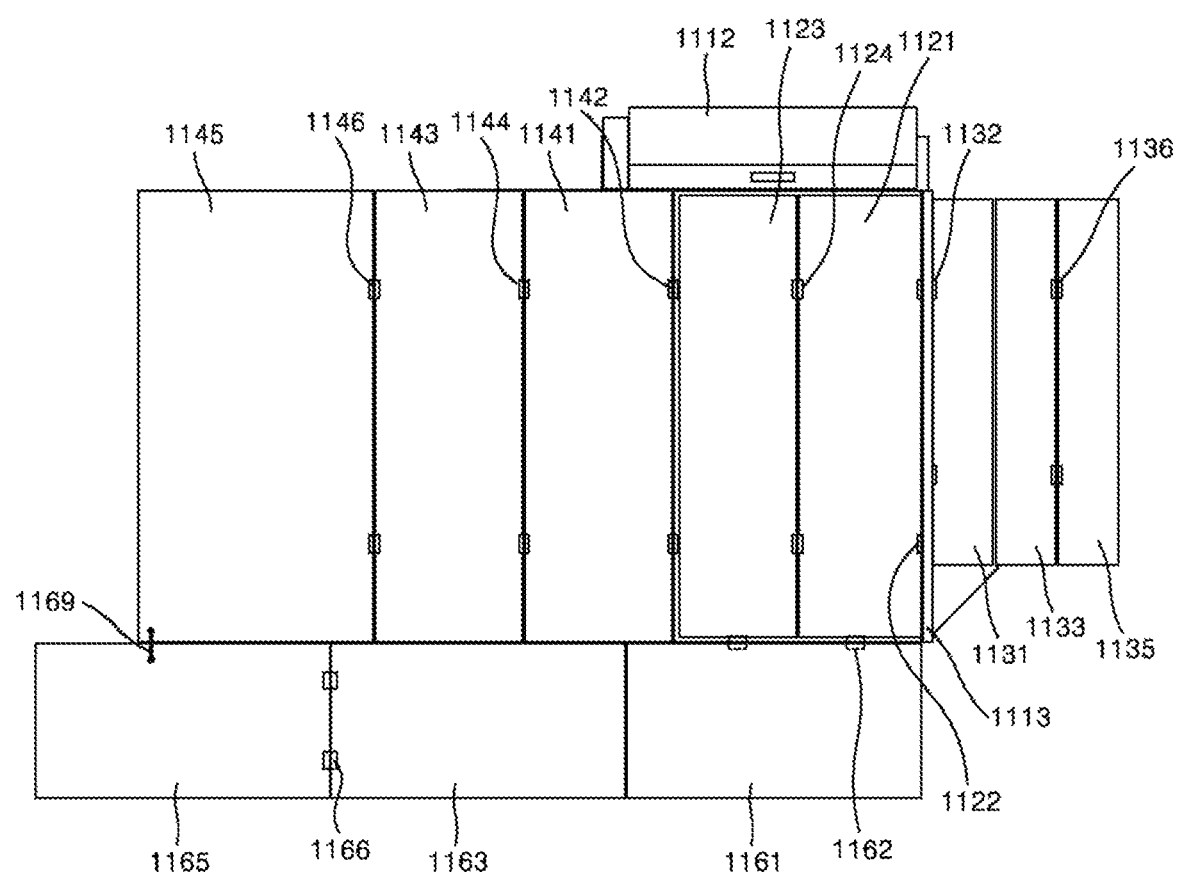
FIG. 4 is a plan view illustrating a main body of a motorcycle sidecar according to an embodiment of the present disclosure.
Figure 5:
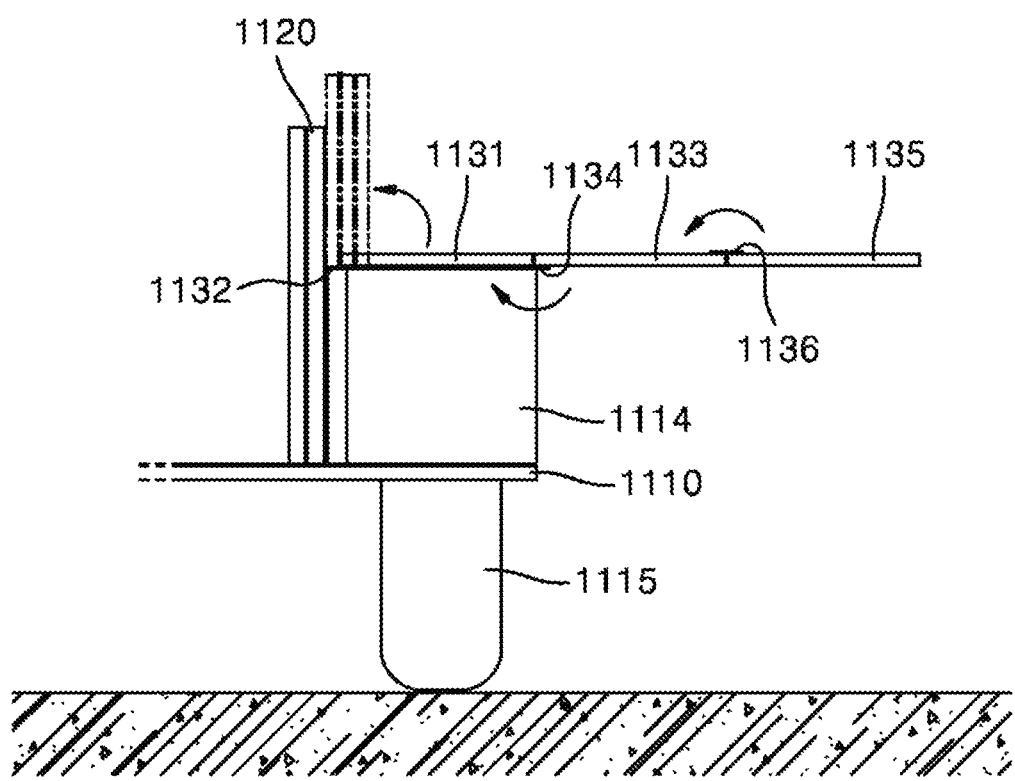
FIG. 5 is a side view illustrating a table plate of a motorcycle sidecar according to an embodiment of the present disclosure.
Figure 6:
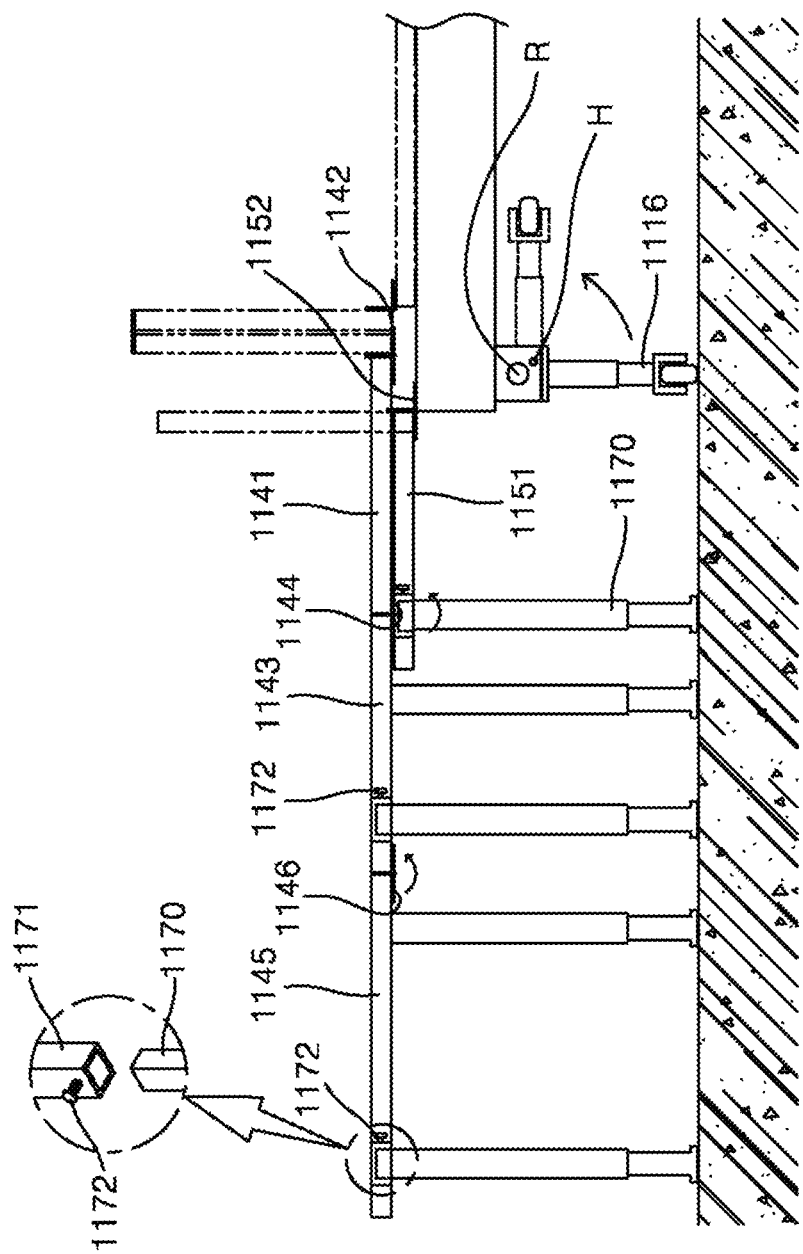
FIG. 6 is a side view illustrating a side plate of a motorcycle sidecar according to an embodiment of the present disclosure.
Figure 7:
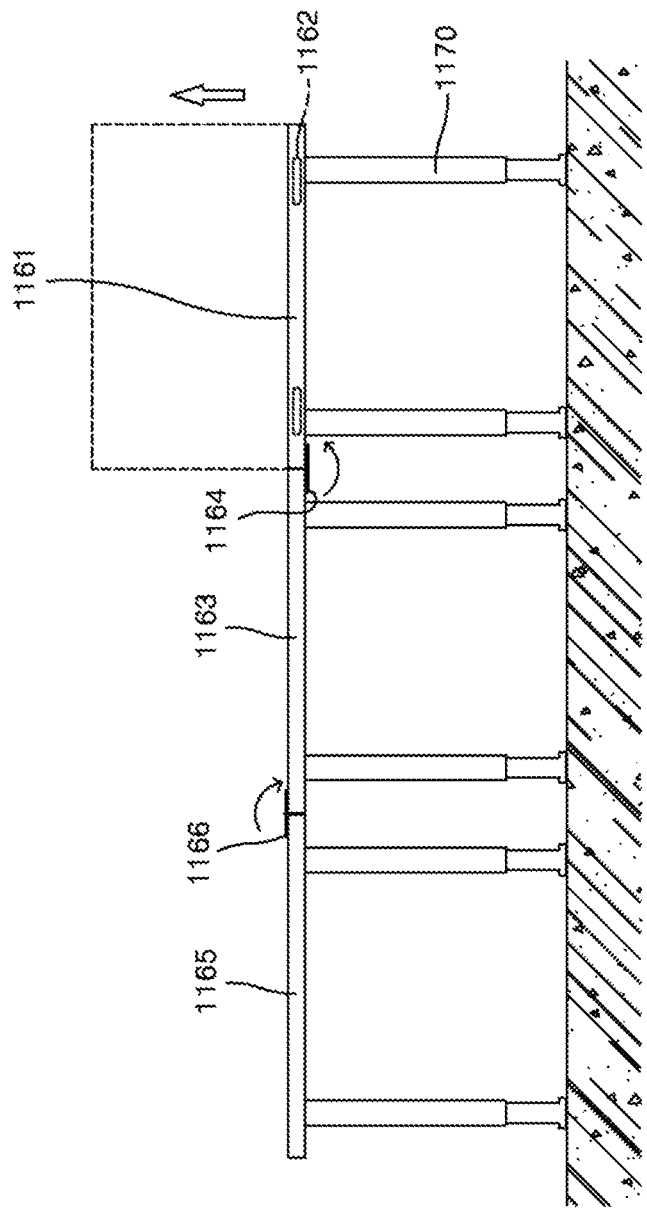
FIG. 7 is a side view illustrating a rear plate of a motorcycle sidecar according to an embodiment of the present disclosure.
Figure 8:
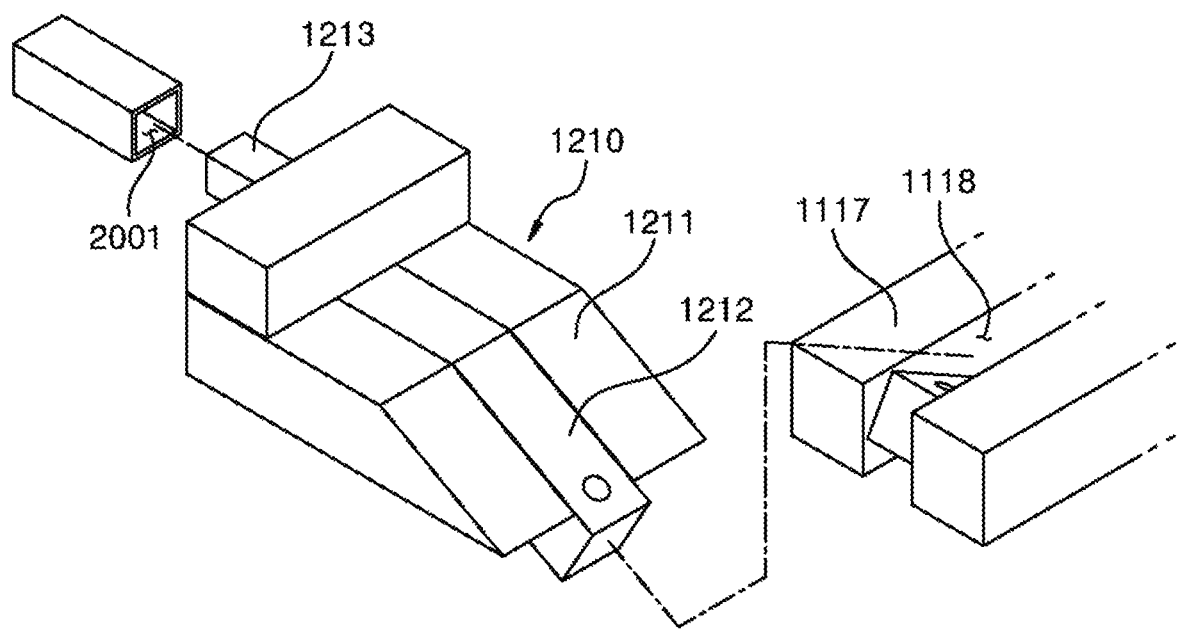
FIG. 8 is an exploded perspective view illustrating a first coupler of a motorcycle sidecar according to an embodiment of the present disclosure.
Figure 9:
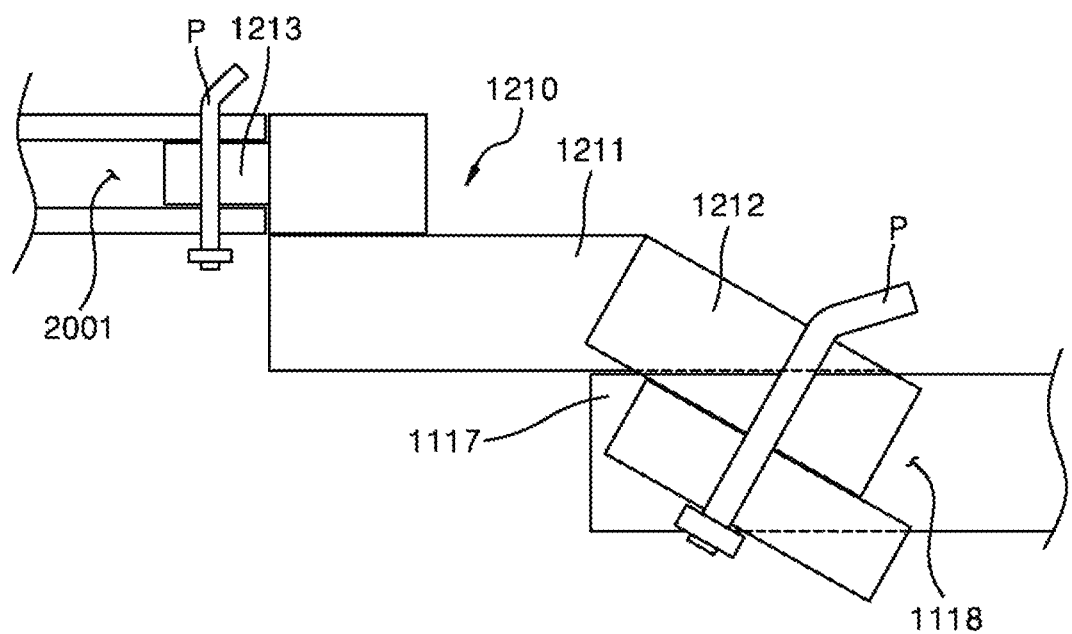
FIG. 9 is a cross-sectional view illustrating a first coupler of a motorcycle sidecar according to an embodiment of the present disclosure.
Figure 10:
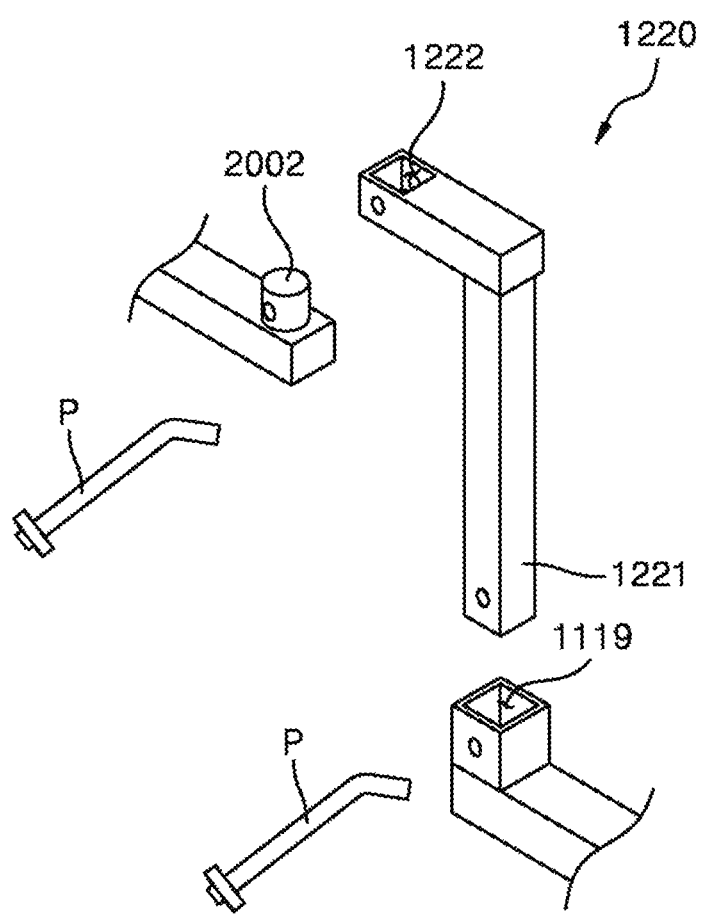
FIG. 10 is an exploded perspective view illustrating a second coupler of a motorcycle sidecar according to an embodiment of the present disclosure.
Figure 11:
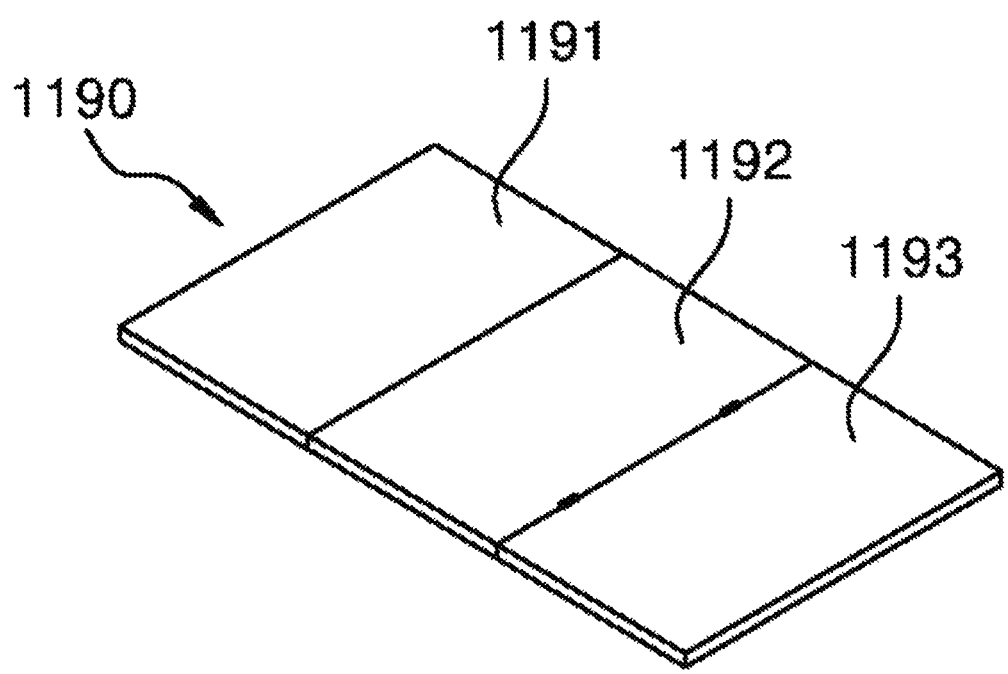
FIG. 11 is a perspective view illustrating a bottom plate of a motorcycle sidecar according to an embodiment of the present disclosure.

FIG. 1 is a perspective view illustrating a motorcycle sidecar according to an embodiment of the present disclosure. FIG. 2 is a perspective view illustrating a main body of a motorcycle sidecar according to an embodiment of the present disclosure. FIG. 3 is a plan view illustrating a main body of a motorcycle sidecar according to an embodiment of the present disclosure. FIG. 4 is a plan view illustrating a main body of a motorcycle sidecar according to an embodiment of the present disclosure. FIG. 5 is a side view illustrating a table plate of a motorcycle sidecar according to an embodiment of the present disclosure. FIG. 6 is a side view illustrating a side plate of a motorcycle sidecar according to an embodiment of the present disclosure. FIG. 7 is a side view illustrating a rear plate of a motorcycle sidecar according to an embodiment of the present disclosure. FIG. 8 is an exploded perspective view illustrating a first coupler of a motorcycle sidecar according to an embodiment of the present disclosure. FIG. 9 is a cross-sectional view illustrating a first coupler of a motorcycle sidecar according to an embodiment of the present disclosure. FIG. 10 is an exploded perspective view illustrating a second coupler of a motorcycle sidecar according to an embodiment of the present disclosure. FIG. 11 is a perspective view illustrating a bottom plate of a motorcycle sidecar according to an embodiment of the present disclosure.

According to an embodiment of the present disclosure, a motorcycle sidecar 1000 includes a main body 1100 positioned at a side of a motorcycle 2000 and a coupling device 1200 connecting the motorcycle sidecar with the main body 1100.

The main body 1100 includes a frame 1110, a base plate 1120, a table plate 1130, a side plate 1140, a sub plate 1150, a rear plate 1160, a support 1170, and a seating member 1180.

A storage compartment 1111 may be provided at the front of the frame 1110. The storage compartment 1111 may be opened and closed by a bonnet 1112.

The storage compartment 1111 may have a triangular or streamlined shape to minimize resistance to winds while the motorcycle sidecar 1000 drives.

There may be a plurality of storage compartments 1111.

main wheel 1115 is coupled to a side of the frame 1110 to support the frame 1110 and to allow the motorcycle sidecar 1000 to drive alongside the motorcycle 2000.

According to an embodiment of the present disclosure, although the drawings show that there is one main wheel 1115 at a side of the frame 1110, embodiments of the present disclosure are not limited thereto. For example, there may be provided a plurality of main wheels 1115.

A side plate 1113 is provided at a side of the frame 1110 on the top of the frame 1110 to be perpendicular to the top of the frame 1110. A guard 1114 is provided at a side of the side plate 1113 to surround an upper part of the main wheel 1115 away from the main wheel 1115.

The main body 1100 is coupled to the motorcycle 2000 with the frame 1100 positioned parallel to the ground.

When the main body 1100 is separated from the motorcycle 2000, since the main wheel 1115 is provided at the side of the main body 1100, the main body 1100 may be tilted to the other side of the main body 1100.

Accordingly, an auxiliary roller 1116 may be provided at the opposite side of the main body 1100 on the bottom of the frame 1110 to allow the frame 1110 to remain parallel to the ground.

According to an embodiment, one auxiliary roller 1116 and another auxiliary roller 1116, respectively, may be provided at the front and rear of the opposite side of the main body 1100 on the bottom of the frame 1110 to balance the frame 1110.

Not only does allow the frame 1110 to remain parallel to the ground when the main body 1100 is separated from the motorcycle 2000, but the auxiliary roller 1116, along with the main wheel 1115, facilitates the movement of the main body 1100.

Further, the auxiliary roller 1116 may be attached to the bottom of the frame 1110 to be folded or unfolded by a roller hinge R.

For example, the auxiliary roller 1116 may be unfolded when the main body 1100 is separated from the motorcycle 2000 and be folded when the main body 1100 is coupled to the motorcycle 2000.

The auxiliary roller 1116 may be configured to adjust its length in the upper and lower directions to allow the main body 1100 and the motorcycle 2000 to remain parallel to each other when the main body 1100 and the motorcycle 2000 are coupled to or removed from each other.

The auxiliary roller 1116 may have a roller fastening hook H to keep the auxiliary roller 1116 in the position folded or unfolded by the roller hinge R.

The base plate 1120 is rotatably coupled to a side of the side plate 1113 on the top surface of the frame 1110.

For example, the base plate 1120 includes a first base board 1121 and a second base board 1123. The first base board 1121 is rotatably coupled to the side of the side plate 1113 by a first base hinge 1122. The second base board 1123 is rotatably coupled to a side of the first base board 1121 by a second base hinge 1124.

As the first base board 1121 and the second base board 1123 rotate, the first base board 1121 and the second base board 1123 may be unfolded on the top of the frame 1110 or stand on the top of the frame 1110 in the folded position.

While the first base board 1121 and the second base board 1123 turn from their unfolded position to their folded and upright position, the first base board 1121 may rotate up at about 90 degrees, and the second base board 1123 may rotate down at about 180 degrees.

The first base board 1121 and the second base board 1123, upon unfolding, turn in the opposite directions.

When the first base board 1121 and the second base board 1123 are in their standing position, the first base board 1121 and the second base board 1123 may be brought in parallel and contact with the side plate 1113.

For example, the first base board 1121 and the second base board 1123 may be formed to have the same size, but embodiments of the present disclosure are not limited thereto.

The table plate 1130 is rotatably coupled to a side of the side plate 1113 over the guard 1114.

For example, the table plate 1130 includes a first table board 1131, a second table board 1133, and a third table board 1135. The first table board 1130 is provided over the guard 1114 to be rotatably by a first table hinge 1132. The second table board 1133 is coupled to a side of the first table board 1131 to be rotatable by a second table hinge 1134. The third table board 1135 is coupled to a side of the second table board 1133 to be rotatable by a third table hinge 1136.

The first table board 1131, the second table board 1133, and the third table board 1135 may be unfolded along the top of the guard 1114 in parallel with the ground or be folded in a zig-zag shape into a standing position.

The first table board 1131 is supported on the top of the guard 1114, and the second table board 1133 and the third table board 1135 are supported with their respective opposite sides contacting each other.

For example, the third table hinge 1136 may mutually connect a side of the second table board 1133 with a side of the third table board 1135 so that, when the second table board 1133 and the third table board 1135 are unfolded on each other, their respective opposite sides may support each other.

While the first table board 1131, the second table board 1133, and the third table board 1135 turn from their unfolded position to their upright position, the first table board 1131 may rotate up at about 90 degrees, the second table board 1133 may rotate down at about 180 degrees, and the third table board 1135 may rotate up at about 180 degrees.

While the first table board 1131, the second table board 1133, and the third table board 1135 turn from their folded, upright position to their unfolded position, the first table board 1131, the second table board 1133, and the third table board 1135 may rotate in their opposite directions.

The table plate 1130 in its unfolded position may be supported on the top of the guard 1114, allowing the table plate 1130 to be available as a legless table.

The first table board 1131, the second table board 1133, and the third table board 1135, in the upright position, may be fastened onto the top of the guard 1114 by a first fastener 1137 coupled to the third table board 1135, maintaining the upright position.

The first fastener 1137 may be formed as a latch, which is commonly used. A first latch pin may be movably formed on the third table board 1135, and a first latch hole may be formed in the top of the guard 1114 to allow the first latch pin to fit thereinto, enabling locking.

A first fastening ring 1138 is provided to mutually couple the second table board 1133 and the third table board 1135 on the tops of the second table board 1133 and the third table board 1135 when the table plate 1130 is in its upright position.

The first fastening ring 1138 may be substantially U-shaped. The first fastening ring 1138 may fit and fasten onto the respective tops of the second table board 1133 and the third table board 1135.

The side plate 1140 is rotatably coupled to a side of the frame 1110 on the top of the frame 1110.

For example, the side plate 1140 includes a first side board 1141, a second side board 1143, and a third side board 1145. The first side board 1141 is coupled to be rotatable sideways by a first side hinge 1142. The second side board 1143 is coupled to a side of the first side board 1141 to be rotatable by a second side hinge 1143. The third side board 1145 is coupled to a side of the second side board 1143 to be rotatable by a third side hinge 1146.

The first side board 1141, the second side board 1143, and the third side board 1145, upon rotation, may be unfolded to extend sideways further away from the frame 1110, or the first side board 1141 and the second side board 1143 may be folded into their upright position while the third side board 1145 is spread over the top of the frame 1110.

While the first side board 1141, the second side board 1143, and the third side board 1145 turn from their unfolded position to the upright position, the first side board 1141 may rotate up at about 90 degrees, the second side board 1143 may rotate up at about 180 degrees, and the third side board 1145 may rotate down at about 90 degrees.

The side plate 1140, when in the folded position, may be substantially in an L shape.

When the side plate 1140, specifically the third side board 1145, is unfolded on the top of the frame 1110, a step may occur between the side plate 1140 and the frame 1110. The width of the third side board 1145 may be the same as the width of the base plate 1120 in the unfolded position so that the step between the side plate 1140 and the frame 1110 may be covered by the base plate 1120.

When the side plate 1140 is in the folded position, a bottom plate 1190 may be covered onto the top of the third side board 1145, which is upside down when folded.

The bottom plate 1190 includes a first bottom board 1191, a second bottom board 1192, and a third bottom board 1193.

The first bottom board 1191, the second bottom board 1192, and the third bottom board 1193 are rotatably coupled to each other.

A second fastener 1147 may be provided to maintain the folded, i.e., upright, position of the side plate 1140.

The second fastener 1147 is coupled to an upper portion of the first side board 1141 in the upright position of the first side board 1141 and the second side board 1143, and the second fastener 1147 is fixed onto a rear surface of the storage compartment 1111 to maintain the upright position of the first side board 1141 and the second side board 1143.

The second fastener 1147 may be formed as a latch which is commonly used. A second latch pin is movably formed on the first side board 1141, and a second latch pin is formed in the rear surface of the storage compartment 1111 to allow the second latch pin to fit thereinto, thereby enabling locking.

The sub plate 1150 is rotatably coupled to a farthest side of the frame 1110 on the top of the frame 1110.

For example, the sub plate 1150 includes a sub board 1151. The sub board 1151 is coupled to the side of the frame 1110 to be rotatable by a sub hinge 1152.

The sub board 1151 may be rotated to extend in parallel or perpendicular to the frame 1110.

The sub board 1151, upon turning from the unfolded to upright position, rotates up.

The sub board 1151, upon unfolding, rotates in the opposite direction.

As the sub plate 1150 extends in parallel with the frame 1110 to unfold the side plate 1140, the sub plate 1150 may support the first side board 1141 and the second side board 1143.

The sub plate 1150 may have a third fastener to maintain its upright position.

The third fastener 1153 is fixed to the rear surface of the storage compartment 1111 to keep the sub plate 1150 in the upright position.

The third fastener 1153 may be formed as a latch which is commonly used. A third latch pin may be movably formed on the sub plate 1151, and a third latch hole may be formed in the rear surface of the storage compartment 1111 to allow the third latch pin to fit thereinto, enabling locking.

The side plate 1140 in the upright position may be spaced apart from the sub plate 1150, leaving a space that may be utilized for storage.

A separate (safety) net may be provided in the storage space to cover the top and rear surfaces which are opened.

The rear plate 1160 is rotatably coupled to a rear surface of the frame 1110.

For example, the rear plate 1160 includes a first rear board 1161, a second rear board 1163, and a third rear board 1165.

The first rear board 1161 is coupled to the rear surface of the frame 1110 to be rotatable in the rear direction by a first rear hinge 1162. The second rear board 1163 is coupled to a side of the first rear board 1161 to be rotatable by a second rear hinge 1164. The third rear board 1165 is coupled to a side of the second rear board 1163 to be rotatable by a third rear hinge 1166.

The first rear board 1161 may be unfolded in the rear surface direction of the frame 1110, and the second rear board 1163 and the third rear board 1165 may be unfolded in the side direction or folded in a zig-zag manner into the upright position.

While the first rear board 1161, the second rear board 1163, and the third rear board 1165 turn from the unfolded position to the upright position, the first rear board 1161 may rotate up at about 90 degrees, the second rear board 1163 may rotate down at about 180 degrees, and the third rear board 1165 may rotate up at about 180 degrees.

The first rear board 1161, the second rear board 1163, and the third rear board 1165, when unfolded, may be rotated in the opposite directions.

The rear plate 1160 may have a fourth fastener 1167 to maintain the folded position.

The fourth fastener 1167 mutually connect the first rear board 1161 and the third rear board 1165 with the first rear board 1161, the second rear board 1163, and the third rear board 1165 folded together.

The fourth fastener 1167 may be formed as a toggle latch.

The rear plate 1160 may have a fifth fastener to maintain the upright position.

The fifth fastener 1168 may be provided as a pin that passes through the side plate 1113 of the frame 1110 to be fastened to the first rear board 1161.

A second fastening ring 1169 may be provided on the tops of the rear plate 1160 and the side plate 1140 to mutually connect the rear plate 1160 and the side plate 1140 in the unfolded position.

The second fastening ring 1169 may be shaped substantially as the letter "n", and may be inserted and fastened to the tops of the rear plate 1160 and the side plate 1140.

There may be a plurality of supports 1170. Each support 1170 may be shaped as a rectangular pillar. The supports 1170 are coupled to support the respective bottoms of the side plate 1140, the sub plate 1150, and the rear plate 1160 when the side plate 1140, the sub plate 1150, and the rear plate 1160 are in their unfolded position.

Each support 1170 is not limited as having the rectangular pillar but may be formed in other various shapes, e.g., a cylinder or a polygonal pillar.

The supports 1170 may be coupled at the corners of the side plate 1140, the sub plate 1150, and the rear plate 1160.

Rectangular tubes 1171 may be formed in the respective corners of the side plate 1140, the sub plate 1150, and the rear plate 1160, and the supports 1170 may fit into the rectangular tubes 1171.

After the supports 1170 are fitted into the rectangular tubes 1171, bolts 1172 may be screwed through the sides of the rectangular tubes 1171, fastening the supports 1170.

The supports 1170 may be formed to be adjustable in height.

Each rectangular tube 1171 may be formed to correspond to the shape of its corresponding support 1170.

Since the first side board 1141 may be supported by the sub board 1151, no supports 1170 may be provided on the first side board 1141 of the side plate 1140.

The supports 1170 may be removed and stored in the storage compartment 1111 when the side plate 1140, the sub plate 1150, and the rear plate 1160 are in the folded positions.

The supports 1170 may be stored not only in the storage compartment 1111 but also in other various storage spaces.

The seating member 1180 may be mounted in the main body 1100. The seating member 1180 may include a seat 1181 for a passenger. The seating member 1180 may be shaped as a canoe.

The seating member 1180 allows a user or passenger to sit in the main body 1100.

When the seating member 1180 is mounted in the main body 1100, the front, rear, and both side surfaces of the seating member 1180 may be brought in tight contact and fastened to the storage compartment 1111, base plate 1120, side plate 1140, and rear plate 1160 of the main body 1100.

The coupling device 1200 may be a means to couple the main body 1100 with the motorcycle 2000. The coupling device 1200 includes a first coupler 1210 and a second coupler 1220.

A first insertion hole 1119 is formed in a portion of a side of the frame 1110, and a first coupling hole 1118 is inclinedly formed between first steps 1117 in another portion of the side of the frame 1110.

A second insertion protrusion 2002 is formed on the top of a side of the motorcycle 2000 in the position opposite the first insertion hole 1119, and a second coupling hole 2001 is formed in the bottom of the side in the position opposite the first coupling hole 1118.

The second insertion protrusion 2002 may be formed to be coupled to or removed from a side surface of the motorcycle 2000. Thus, the motorcycle 2000 may be driven with the main body 1100 removed, without being disturbed by the main body 1100.

A first coupling protrusion 1212 that is inclined is formed at a side of the first coupler 1210 to correspond to the first coupling hole 1118. Second steps 1211 are formed at both sides of the first coupling protrusion 1212 to contact the first steps 1117.

A second coupling protrusion 1213 is formed at another side of the first coupler 1210 to be fitted into the second coupling hole 2001 of the motorcycle 2000.

The first coupling protrusion 1212 and the first coupling hole 1118 may be formed to be inclined at about 45 degrees, allowing the first coupling protrusion 1212 to be guided along the slope and inserted into the first coupling hole 1118.

The second coupler 1220 includes a first insertion protrusion 1221 vertically extending down and inserted into the first insertion hole 1119 and a second insertion hole 1222 in the top to allow the second insertion protrusion 2002 to be fitted thereto.

According to an embodiment of the present disclosure, there may be provided a plurality of first couplers 1210 and a plurality of second couplers 1220. The first coupling hole 1118 and the first coupling protrusion 1212, the second coupling hole 2001 and the second coupling protrusion 1213, the first insertion hole 1119 and the first insertion protrusion 1221, and the second insertion hole 1222 and the second insertion protrusion 2002 may be fitted together and penetrated sideways and fastened by fastening pins P.

Each fastening pin P may be a cotter pin.

An ice box 2003 may be installed at the rear of the motorcycle 2000.

The operation of the motorcycle sidecar 1000 is described below.

The main body 1100 may be coupled to the motorcycle 2000 and drive together with the motorcycle 2000, with the table plate 1130, the side plate 1140, the sub plate 1150, and the rear plate 1160 folded up.

The main body 1100 may be separated from the motorcycle 2000 by removing the fastening pins P to separate the first coupler 1210 and the second coupler 1220.

To remove the main body 1100 from the motorcycle 2000, the fastening pins P are removed and, then, the second coupler 1220 is removed.

The fastening pin P of the first coupler 1210, which is positioned adjacent the main body 1100, is first removed.

Then, the motorcycle 2000 is tilted away from the main body 1100 and is then disconnected from the main body 1100.

Thereafter, the first coupler 1210 which remains attached to the motorcycle 2000 is taken off by removing the fastening pin P, thus addressing inconvenience due to its protruding and left-right imbalance in the motorcycle 2000 while the motorcycle 2000 drives with the main body 1100 detached.

When the main body 1100 is separated from the motorcycle 2000, the main body 1100 may be tilted sideways. In this case, before separation of the main body 1100 from the motorcycle 2000, the auxiliary roller 1116 may be unfolded to support the main body 1100 to allow the main body 1100 to remain parallel to the ground.

The main body 1100 may be leveled, relocated or moved a short distance by the main wheel 1115 and the auxiliary roller 1116.

The rear plate 1160 is unfolded to remove the seating member 1180 after placing the main body 1100 in, e.g., a camp site.

The first rear plate 1161 is coupled to the support 1170 and is then unfolded. The second rear plate 1163 and the third rear plate 1165 are unfolded.

The seating member 1180 is removed and, then, the bottom plate 1190 is separated.

Thereafter, unfolding continues with the sub plate 1150. The side plate 1140 is unfolded, followed by unfolding the base plate 1120.

The base plate 1120 may cover the step between the top of the frame 1110 and the side plate 1140.

If the sub plate 1150, the side plate 1140, the base plate 1120, and the rear plate 1160 are unfolded, the main body 1100 is rendered to appear like a wood bench or deck.

A tent or mat may be placed on the main body 1100 completely unfolded.

The main body 1100 may be folded in the reverse order.

According to embodiments of the present disclosure, a sidecar may be attached and detached to the side of a motorcycle, addressing insufficient storage space.

As the side and rear part of the sidecar may be unfolded and supported by supports, the sidecar may be utilized as a camping deck or bench.

The seating member may be shaped as a canoe and be detachably formed. For example, the user may enjoy canoeing using the seating member.

The main body may be utilized as a carrier or storage, with the seating member removed and the bottom plate installed.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

What is claimed is:

1. A multifunctional sidecar for a motorcycle, comprising:
a frame detachably provided at a side of the motorcycle and having a main wheel at a side thereof;
a base plate rotatably coupled to a first side of the frame and folded in an upright position or unfolded to overlap a top of the frame;
a side plate rotatably coupled to a second side of the frame and folded in an upright position or unfolded to extend from the second side of the frame;
a rear plate rotatably coupled to a rear portion of the frame and folded in an upright position or unfolded to extend from the rear portion of the frame;
supports supporting the side plate and the rear plate when the side plate and the rear plate are in the unfolded positions; and
a coupling device connecting the sidecar with the motorcycle, wherein the base plate includes a first base board rotatably coupled to the frame by a first base hinge and a second base board rotatably coupled to the first base board by a second base hinge, the side plate includes a first side board rotatably coupled to the frame by a first side hinge, a second side board rotatably coupled to the first side board by a second side hinge, and a third side board rotatably coupled to the second side board by a third side hinge, and the rear plate includes a first rear board rotatably coupled to the frame by a first rear hinge, a second rear board rotatably coupled to the first rear board by a second rear hinge, and a third rear board rotatably coupled to the second rear board by a third rear hinge.

2. The sidecar of claim 1, further comprising a bottom plate detachably provided to overlap a top of the third side board when the first side board and the second side board are rotated into the upright position, and the third side plate is rotated to overlap the top of the frame.

3. The sidecar of claim 2, wherein the bottom plate includes a first bottom board, a second bottom board, and a third bottom board rotatably coupled to each other.

4. The sidecar of claim 1, further comprising a storage compartment in a front portion of the frame, the storage compartment opened and closed by a bonnet, wherein a side plate is provided at a side of the base plate, and wherein a first fastener is configured to fasten the side plate in the upright position to the storage compartment, and a second fastener is configured to fasten the rear plate in the upright position to the side plate.

5. The sidecar of claim 1, further comprising a buoyant seating member having a seat and detachably provided on the top of the frame.

6. The A sidecar for a motorcycle, comprising:
a frame detachably provided at a side of the motorcycle and having a main wheel at a side thereof:
a base plate rotatably coupled to a first side of the frame and folded in an upright position or unfolded to overlap a top of the frame;
a side plate rotatably coupled to a second side of the frame and folded in an upright position or unfolded to extend from the second side of the frame;
a rear plate rotatably coupled to a rear portion of the frame and folded in an upright position or unfolded to extend from the rear portion of the frame;
supports supporting the side plate and the rear plate when the side plate and the rear plate are in the unfolded positions; and
a coupling device connecting the sidecar with the motorcycle, wherein the second side of the frame includes a first insertion hole and a first coupling hole that is inclined and positioned between two opposite steps, wherein a side of the motorcycle includes a second insertion protrusion and a second coupling hole, wherein the coupling device includes a first coupler and a second coupler, wherein a first side of the first coupler includes a first coupling protrusion inclined to correspond to the first coupling hole and second steps provided at both sides of the first coupling protrusion and contacting the first steps, and a second side of the first coupler includes a second coupling protrusion fitted into the second coupling hole, and wherein a first side of the second coupler includes a first insertion protrusion fitted into the first insertion hole and a second side of the second coupler includes a second insertion hole fitted over the second insertion protrusion.

7. The sidecar of claim 6, wherein the first coupling hole and the first coupling protrusion, the second coupling hole and the second coupling protrusion, the first insertion hole and the first insertion protrusion, and the second insertion hole and the second insertion protrusion are mutually fastened by fastening pins passing therethrough.

* * * * *